US011936328B2

(12) United States Patent
Demsa et al.

(10) Patent No.: US 11,936,328 B2
(45) Date of Patent: Mar. 19, 2024

(54) METHOD OF OPERATING A HYBRID POWER PLANT TO OPTIMIZE PV POWER OUTPUT

(71) Applicant: VESTAS WIND SYSTEMS A/S, Aarhus N (DK)

(72) Inventors: Loránd Demsa, Aarhus C (DK); Karthikeya Balladi Raghuchandra, Aarhus N (DK); Jacob Jensen, Skødstrup (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 351 days.

(21) Appl. No.: 17/270,380

(22) PCT Filed: Aug. 14, 2019

(86) PCT No.: PCT/DK2019/050242
§ 371 (c)(1),
(2) Date: Feb. 22, 2021

(87) PCT Pub. No.: WO2020/038537
PCT Pub. Date: Feb. 27, 2020

(65) Prior Publication Data
US 2021/0194408 A1    Jun. 24, 2021

(30) Foreign Application Priority Data

Aug. 21, 2018  (DK) .......................... PA 2018 70542

(51) Int. Cl.
*H02J 3/38*   (2006.01)
*F03D 7/02*   (2006.01)
(Continued)

(52) U.S. Cl.
CPC ............ *H02S 10/12* (2014.12); *F03D 7/0204* (2013.01); *F03D 7/0224* (2013.01);
(Continued)

(58) Field of Classification Search
CPC . F03D 9/007; F03D 9/25; F03D 80/20; H02S 10/12; F05B 2220/708; Y02E 10/50; Y02E 10/72; Y02E 20/16
See application file for complete search history.

(56) References Cited

U.S. PATENT DOCUMENTS

2009/0284240 A1   11/2009  Zhang et al.
2009/0289455 A1   11/2009  Wobben
(Continued)

FOREIGN PATENT DOCUMENTS

EP       2657515 A1    10/2013
JP    2004360508 A    12/2004
(Continued)

OTHER PUBLICATIONS

Danish Patent and Trademark Office 1st Technical Examination for Application No. PA 2018 70542 dated Nov. 4, 2019.
(Continued)

*Primary Examiner* — Lincoln D Donovan
*Assistant Examiner* — Alex W Lam
(74) *Attorney, Agent, or Firm* — Patterson + Sheridan, LLP

(57) ABSTRACT

The present disclosure relates to a method of controlling operation of wind turbine generators (WTGs) in a hybrid power plant including both WTGs and PV modules. The method includes steps of: monitoring at least one operating parameter for one or more of the WTGs; monitoring at least one operating parameter for one or more of the PV modules; and controlling operation of the WTGs in dependence on the monitored operating parameters in order to control blade shadows cast by the WTGs on the PV modules and thereby optimise the power output of the PV modules, for example by reducing the blade shadow area cast on the PV modules.

19 Claims, 3 Drawing Sheets

(51) Int. Cl.
*F03D 13/20* (2016.01)
*F03D 80/20* (2016.01)
*H02S 10/12* (2014.01)

(52) U.S. Cl.
CPC ........... *F03D 7/0264* (2013.01); *F03D 13/22* (2016.05); *F03D 80/20* (2016.05); *H02J 3/381* (2013.01); *F05B 2220/708* (2013.01); *H02J 2300/28* (2020.01)

(56) References Cited

U.S. PATENT DOCUMENTS

2012/0267901 A1* 10/2012 Shufflebotham ........ H02S 10/12 290/1 R
2015/0340984 A1   11/2015 Shoukat

FOREIGN PATENT DOCUMENTS

| JP | 2018007423 A | 1/2018 |
|---|---|---|
| JP | 2019157633 A | 9/2019 |
| WO | 2009030252 A1 | 3/2009 |
| WO | 2017193153 A1 | 11/2017 |
| WO | 2020038537 A1 | 2/2020 |

OTHER PUBLICATIONS

Venkataraman Sundar et al. Integrated Wind, Solar, and Energy Storage: Designing Plants with a Better Generation Profile and Lower Overall Cost. IEEE Power and Energy Magazine, vol. 16, Issue 3, May-Jun. 2018, pp. 74-83.

Mamia I. et al. Shadow analysis of wind turbines for dual use of land for combined wind and solar photovoltaic power generation. Renewable and Sustainable Energy Reviews. vol. 55, Mar. 2016, pp. 713-718.

PCT Notification of Transmittal of the International Search Report and the Written Opinion of the International Searching Authority, or the Declaration for Application No. PCT/DK2019/050242 dated Oct. 23, 2019.

* cited by examiner

METHOD OF OPERATING A HYBRID POWER PLANT TO OPTIMIZE PV POWER OUTPUT

TECHNICAL FIELD

The present disclosure relates to a method of operating a hybrid power plant comprising wind turbine generators (WTGs) and PV modules that are affected by blade shadows, in which the WTGs are controlled in order to optimise the power output of the PV modules.

BACKGROUND

Wind/solar hybrid power plants include a combination of wind turbine generators (WTGs) and PV modules that are configured to supply power to an external power transmission network or grid. By including both WTGs and PV modules in a single power plant it is possible to increase the amount of renewable energy that can be generated by the power plant, and provide more reliable power generation across a range of operating conditions. However, when PV modules are located close to WTGs in a hybrid power plant the PV modules may be affected by shadows cast by the WTGs, including static shadows cast by the WTG towers and moving or flickering shadows cast by the blades of the WTG rotors.

WTG shadows cast on PV modules result in several disadvantages. For example, tower shadows and blade shadows may reduce the amount of light falling on the PV modules and therefore reduce total PV power output. In addition, moving blade shadows may also result in suboptimal functioning of the PV modules' Maximum Power Point Tracking systems, thereby reducing total PV power output further. In addition, uneven loading of the PV modules due to different shading conditions at different locations caused by the tower shadows and blade shadows can also lead to accelerated degradation of the PV modules.

One solution to these problems is to place the PV modules in locations that are not affected by WTG shadows. However, this solution generally requires a reduction in the number of PV modules in the power plant and/or an increase in the area of the power plant.

It is an object of the present invention to address the disadvantages of known wind/solar hybrid power plants.

SUMMARY OF THE INVENTION

According to a first aspect of the present invention there is provided a method of operating a hybrid power plant comprising at least one WTG and at least one PV module, wherein at least one of the PV modules is at a location within the hybrid power plant that is affected by blade shadows, the method comprising: monitoring at least one operating parameter for one or more of the WTGs; monitoring at least one operating parameter for one or more of the PV modules; and controlling operation of the WTGs in dependence on the monitored operating parameters in order to control blade shadows cast by the WTGs on the PV modules and thereby optimise the power output of the PV modules.

By taking the effects of the blade shadows cast by the WTGs on the PV modules into account when controlling operation of the WTGs it is possible to increase the power output of the PV modules to an optimum extent, for example by reducing the blade shadow area on the PV modules, while also minimising WTG production loss. The present invention therefore allows the combined power output of the hybrid power plant (including WTG power output and PV power output) to be increased across a broad range of operating conditions compared to the combined power output that would be achieved if the WTGs were controlled to optimise and/or maximise WTG power output in a conventional manner without taking into account the effects of blade shadows on the power output of the PV modules.

It will be appreciated that all references throughout the specification to reductions in blade shadow area and increases in combined power output or PV power output are references to reductions in blade shadow area and increases in combined power output or PV power output compared to a situation in which the WTGs are controlled to optimise and/or maximise WTG power output in a conventional manner without taking into account the effects of blade shadows on the power output of the PV modules.

It will also be appreciated that controlling operation of the WTGs in order to optimise the power output of the PV modules does not necessarily mean that the WTGs are controlled in such a manner that the blade shadow area on the PV modules is reduced to the minimum possible level so that the power output from the PV modules can be increased to the highest possible level, which would generally require the WTGs to be stopped or operated in a highly compromised manner that would generally lead to a reduction in combined power output. Instead it means that the WTGs, where appropriate, are operated in such a manner that the negative effect of the blade shadows on the PV modules is reduced such that the power output of the PV modules can be increased to an optimum level while still maintaining an acceptable power output from the WTGs, thereby allowing the combined power output of the hybrid power plant to be optimised and/or maximised.

The hybrid power plant may generally include any number of WTGs in any suitable positions. The hybrid power plant may also include any number of PV modules in any suitable positions, including at locations around and/or between any one or more of the WTGs. As described above, at least one of the PV modules is at a location that is affected by blade shadows. It will be appreciated that a location that is affected by blade shadows means any location within the hybrid power plant that experiences shadow flicker caused by the blades of at least one of the WTGs during at least a portion of the day.

Each PV module may comprise one or more PV cells, which may be connected to each other in series or in parallel. In some cases each PV module may comprise a single, self-contained unit of PV cells. In other cases each PV module may be formed by a plurality of separate units, which may be connected to each other in series or in parallel. Accordingly the term "PV module" should not be construed as being limiting on the number of PV cells or the manner in which the PV cells are connected.

The monitored operating parameters for the WTGs used in controlling operation of the WTGs may include any one or more of: wind speed, direction and/or turbulence at one or more locations; the power output of one or more of the WTGs; blade load at one or more of the WTGs; cable losses for one or more of the WTGs; and the operational status of one or more of the WTGs (for example whether a WTG is currently functional or off-line). In some embodiments noise constraints on WTG operation may also be taken into account when controlling operation of the WTGs in order to optimise the power output of the PV modules.

The monitored operating parameters for the PV modules used in controlling operation of the WTGs may include any one or more of light conditions (for example solar irradiance) at one or more locations inside the hybrid power plant; light conditions (for example solar irradiance) at one or more reference locations outside the influence of WTG shadows; sun position; time; date; the power output of one or more of the PV modules; current or voltage of one or more of the PV modules; cable losses for one or more of the PV modules; and the operational status of one or more of the PV modules (for example whether a PV string is currently functional or off-line). It will be appreciated that operating parameters for the PV modules may be monitored at a string, table or segment level instead of being monitored for each PV module individually.

The WTGs may be controlled in dependence on the output of a shadow tracking system that is configured to determine the blade shadow cast by the rotor of one or more of the WTGs. The shadow tracking system may be configured to measure, calculate and/or predict the blade shadow cast by the rotor of one or more of the WTGs using an algorithm or look up table, for example in dependence on any one or more of the layout of the hybrid power plant, operational data for one or more of the WTGs (including yaw angle and/or pitch angle), measured light conditions, sun position, time and date. The shadow tracking system may be an on-line system that is configured to determine blade shadows in dependence on measured light conditions in combination with operational data related to the WTGs. However, the shadow tracking system may alternatively or in addition be capable of determining blade shadows without access to measured light conditions in dependence on the time and date or sun position in combination with operational data related to the WTGs.

The WTGs may be controlled in dependence on a hybrid power plant level shadow evaluation. It will be appreciated that a hybrid power plant level shadow evaluation means an evaluation of the distribution of shadows cast by the WTGs on the PV modules across the hybrid power plant as a whole.

The WTGs may be controlled in dependence on the layout of the hybrid power plant. For example, the WTGs may be controlled in dependence on the positions of the PV modules relative to the WTGs in order to take account of different PV module arrangements around different WTGs. Information related to the layout of the hybrid power plant, for example a model of the hybrid power plant, may be stored in a database, for example a database of a power plant controller. The information related to the layout of the hybrid power plant may include the locations and dimensions of the WTGs and the PV modules. The locations of the PV modules may be defined with respect to the hybrid power plant, or alternatively with respect to one or more of the WTGs.

The WTGs may be controlled individually and/or in groups in order to take account of different operating conditions at different WTGs and/or the positions of nearby PV modules relative to each WTG. However, in some cases the same control strategy may be applied to each WTG in the hybrid power plant in order to simplify control of the hybrid power plant.

The step of controlling operation of the WTGs may comprise determining whether or not performing a particular WTG control operation would increase or decrease the combined WTG and PV power output of the hybrid power plant, and performing the WTG control operation if it is determined that doing so would increase the combined WTG and PV power output of the hybrid power plant. The WTG control operation may, for example, comprise changing the nacelle yaw angle and/or the blade pitch angle for one or more of the WTGs and/or stopping one or more of the WTGs in order to optimise the power output of the PV modules by reducing the shadow area cast on the PV modules by the rotors of the one or more WTGs.

The step of controlling operation of the WTGs may comprise determining a predicted increase in PV power output and a predicted decrease in WTG power output associated with performing a particular WTG control operation, comparing the predicted increase in PV power output to the predicted decrease in WTG power output, and performing the WTG control operation if the predicted increase in PV power output is greater than the predicted decrease in WTG power output.

The step of controlling operation of the WTGs may comprise controlling the nacelle yaw angle of one or more of the WTGs in order to optimise the power output of the PV modules.

The step of controlling operation of the WTGs may comprise controlling the blade pitch angle of one or more of the WTGs in order to optimise the power output of the PV modules.

The nacelle yaw angle set point(s) and/or the blade pitch angle set point(s) may be calculated by a power plant controller. In this case the calculated set point(s) may be communicated from the power plant controller to controllers of the WTGs, which may then control operation of the WTGs in dependence on the set point(s) received from the power plant controller. It will be appreciated that the power plant controller is a control system that is provided in addition to the individual WTG controllers that is configured to govern the operation of the WTGs (and optionally also the PV modules); and that the power plant controller may be provided at any suitable location or locations within and/or outside the hybrid power plant.

Alternatively, or in addition, the nacelle yaw angle set point(s) and/or the blade pitch angle set point(s) may be calculated by WTG controllers of the respective WTGs. In some cases each WTG may be provided with its own dedicated controller, which may be configured to calculate a nacelle yaw angle set point and a blade pitch angle set point for that WTG, although in some cases two or more WTGs may share a common WTG controller, which may be configured to calculate nacelle yaw angle set point(s) and/or the blade pitch angle set point(s) for each of the WTGs associated with that WTG controller.

The step of controlling operation of the WTGs may comprise stopping one or more of the WTGs in order to optimise the power output of the PV modules.

The step of controlling operation of the WTGs may comprise moving one or more WTGs that have been stopped (for example because the wind speed is below the cut-in speed or because it has been determined that the combined power output of the hybrid power plant would be increased by stopping one or more of the WTGs) into a configuration in which the blade shadow cast by that WTG on nearby PV modules is reduced and/or minimised. The minimum shadow configuration may be calculated in dependence on any one or more of WTG location, WTG dimensions, sun position, time, date, and may be set individually for each WTG taking into account the relative positions of nearby PV modules.

The method may further comprise detecting incoming wind and setting one or more WTGs that have been stopped for cut in in dependence on the detection of incoming wind.

According to a further aspect of the present invention there is provided a controller configured to control operation of a hybrid power plant in accordance with the method of the first aspect of the present invention.

According to a further aspect of the present invention there is provided a computer program downloadable from a communications network and/or stored on a machine readable storage medium comprising program code instructions for implementing a method in accordance with the first aspect of the present invention.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
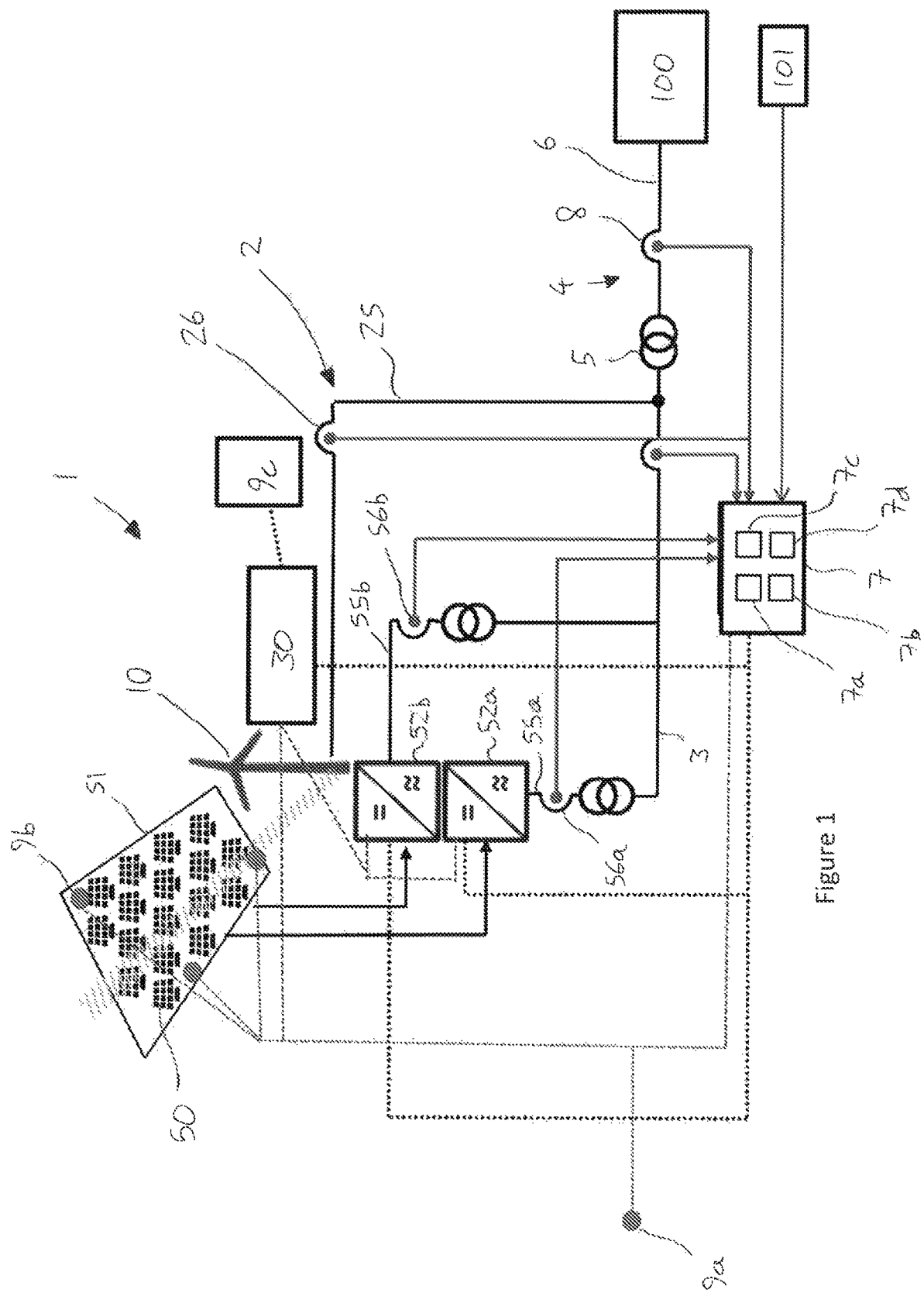
FIG. 1 schematically illustrates a simplified view of a portion of a hybrid power plant in accordance with an embodiment of the present invention.

FIG. 1 schematically illustrates a simplified view of a portion of a hybrid power plant (HPP) 1 in accordance with an embodiment of the present invention. The HPP 1 is connected to an external power transmission network or main grid 100. The main grid 100 may be a regional, national or international power transmission network, for example the National Grid of Great Britain.

The HPP 1 comprises a plurality of wind turbine generators (WTGs) 10 and a plurality of segment 51 of PV modules 50. Each of the WTGs 10 and PV modules 50 is connected to a local grid 2 of the HPP 1 and configured to generate active power to be supplied via the local grid 2 to the main grid 100 for distribution. The local grid 2 is connected to the main grid 100 at a point of interconnection (PoI) 4 via a main step-up transformer 5 and a PoI bus 6.

For simplicity, FIG. 1 only illustrates a single WTG 10 and a single PV segment 51, both of which are connected to a single collector bus 3 of the local grid 2. However, it will be appreciated that the HPP 1 may include any desired number of WTGs 10 and any desired number of PV segments 51, and that the local grid 2 may include any suitable number of collector buses in any suitable arrangement. For example, the HPP 1 may include a plurality of collector buses connected to one or more intermediate voltage buses.

Figure 2:
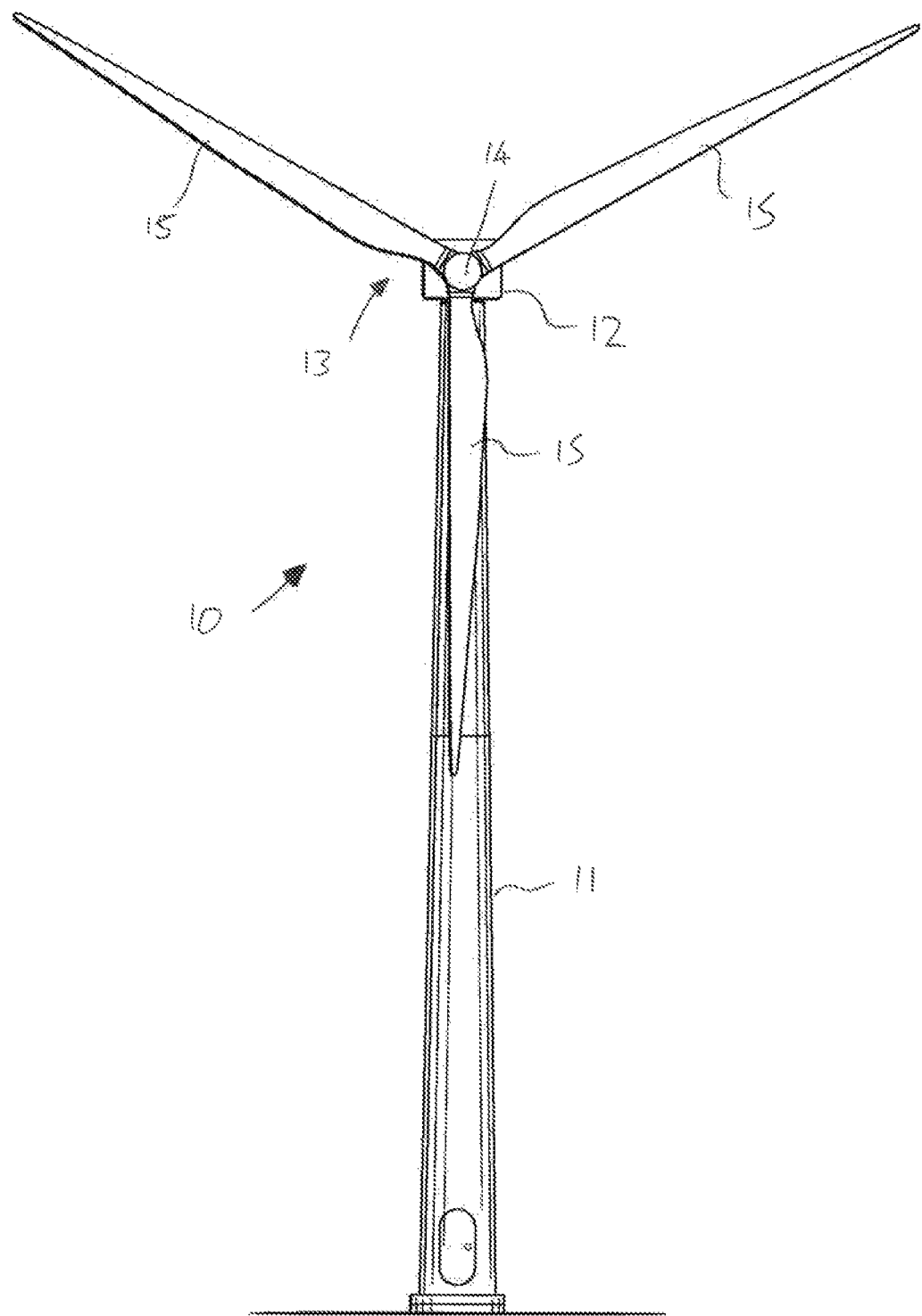
FIG. 2 schematically illustrates a wind turbine generator of the hybrid power plant illustrated in FIG. 1.

FIG. 2 schematically illustrates a typical one of the WTGs 10 of the HPP 1. The WTG illustrated in FIG. 2 is a horizontal axis WTG comprising a tower 11, a nacelle 12, and a rotor 13 including a hub 14 and three blades 15. The following description relates to the WTG 10 illustrated in FIG. 2, but it will be appreciated that the other WTGs 10 of the HPP 1 may have the same or similar features and be connected to the local grid 2 of the HPP 1 in a similar manner.

Figure 3:
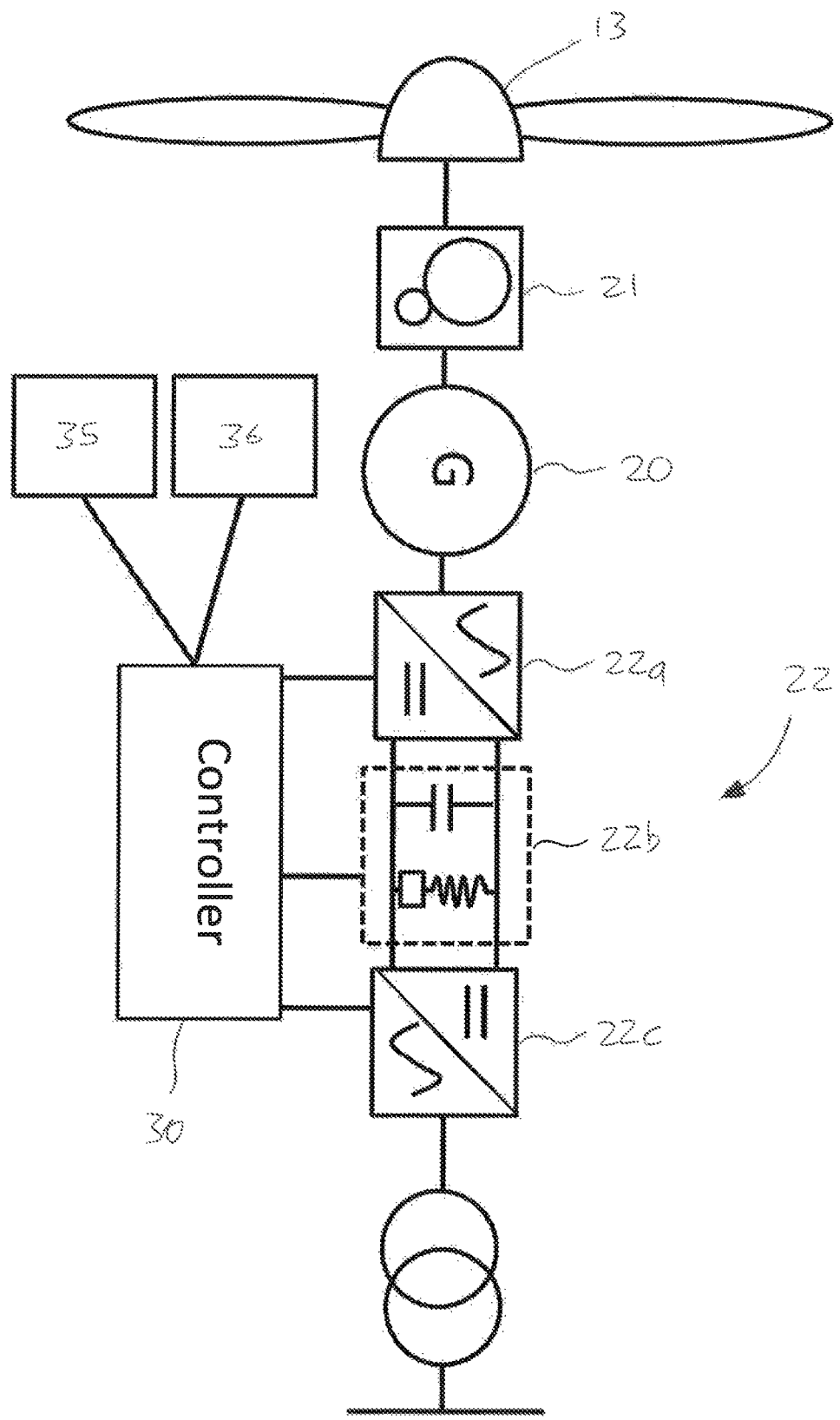
FIG. 3 schematically illustrates the control system and the power generation/converter system of the wind turbine generator illustrated in FIG. 2.

FIG. 3 schematically illustrates the control system and the power generation/converter system of the WTG 10 illustrated in FIG. 2, which may be located partially or entirely within the nacelle 12 of the WTG 10. As shown in FIG. 3, the WTG 10 comprises an electrical generator 20 that is driven by the rotor 13 via a transmission 21, which may optionally include a gearbox. The electrical generator 20 is connected to a WTG converter 22 that is configured to convert the output frequency of the electrical generator to a frequency that is suitable for supplying to the main grid 100. The WTG converter 22 comprises a generator-side AC-DC converter 22a, a DC link 22b including a smoothing capacitor and a chopper system for dissipating excess power, and a grid-side DC-AC converter 22c. The WTG converter 22 is connected to the collector bus 3 by a WTG feeder line 25 via which active power is fed into the local grid 2.

As also shown in FIG. 3, the WTG 10 further comprises a nacelle yaw angle control system 35 and a blade pitch angle control system 36. The yaw angle control system 35 includes at least one actuator that is configured to control the yaw angle of the nacelle 12 of the WTG 10 by rotating the nacelle 12 with respect to the tower 11. The pitch angle control system 36 comprises at least one actuator that is configured to control the pitch angles of the blades 15 of the WTG 10.

As also shown in FIG. 3, the WTG 10 comprises a WTG controller 30 that is in communication with a power plant controller (PPC) 7 of the HPP 1. The WTG controller is configured to monitor and control operation of the WTG 10 in accordance with instructions received from the PPC 7. In the present embodiment each WTG 10 is provided with its own dedicated WTG controller 30, although it will be appreciated that in other embodiments two or more WTGs 10 may share a common, semi-centralised WTG controller, in which case there may be fewer WTG controllers 30 than WTGs 10.

The WTG controller 30 is in communication with the WTG converter 22 and configured to control operation of the AC-DC converter 22a, the smoothing capacitor and chopper system 22b, and the grid-side DC-AC converter 22c. The WTG controller 30 is also in communication with the yaw angle control system 35 and the pitch angle control system 36, and is configured to operate the yaw angle control system 35 and the pitch angle control system 36 in order to control the nacelle yaw angle and the blade pitch angle of the WTG 10 in accordance with yaw angle and pitch angle set points, which may be calculated by the WTG controller 30 or alternatively received from the PPC 7 (as described in more detail below).

As mentioned above, FIG. 1 only illustrates a single PV segment 51, although the HPP 1 may include any desired number of PV segments 51. The following description relates to the PV segment 51 illustrated in FIG. 1, but it will be appreciated that the other PV segments 51 of the HPP 1 may have the same or similar features and be connected to the local grid 2 of the HPP 1 in a similar manner.

The PV segment 51 comprises a plurality of PV tables. Each PV table comprises a support structure to which a plurality of PV units or modules 50 are mounted. Each PV module 50 in turn comprises a plurality of PV cells. The PV modules 50 are arranged in strings, each of which is connected to a PV converter 52a, 52b that is configured to convert the DC output of its respective string(s) to AC with a frequency that is suitable for supplying to the main grid 100. The PV converters 52a, 52b are connected to the collector bus 3 by PV feeder lines 55a, 55b via which active power is fed into the local grid 2.

The PV converters 52a, 52b are in communication with the PPC 7 and configured to monitor and control operation of the PV modules 50 in accordance with instructions received from the PPC 7. The PV converters 52a, 52b may be configured to control operation of the PV modules 50 using a Maximum Power Point Tracking (MPPT) algorithm. The PV converters 52a, 52b are provided separately to the WTG converters 22 and operated independently of the WTG converters, although in some cases some power conversion and transmission hardware may be shared between the PV modules 50 and the WTGs 10.

As illustrated in FIG. 1, the PV segment 51 is located close to the WTG 10 in a position that is affected by shadows cast by the WTG 10, including blade shadows. The PV modules 50 of the PV segment 51 are therefore affected by shadow flicker during at least a portion of the day, which may generally result in reduced PV power output and accelerated degradation compared to PV modules that are not affected by shadow flicker.

As mentioned above, the HPP 1 comprises a power plant controller (PPC) 7 that is in communication with the controllers of the WTGs 10 and the PV modules 50. The PPC 7 is configured to act as a command and control interface between the HPP 1 and the main grid 100, and more particularly between the HPP 1 and a grid operator or transmission system operator (TSO) 101. The PPC 7 comprises a memory module 7a and a processing module 7b. The memory module 7a is configured to store information related to the HPP 1, including a model of the layout of the HPP 1 that includes the locations and dimensions of the WTGs 10 and the locations of the PV modules 50 relative to the WTGs 10. The memory module 7a is also configured to store instructions for governing operation of the HPP 1. The processing module 7b is configured to control operation of the WTGs 10 and the PV segments 51 in accordance with instructions stored by the memory module 7b and instructions received from the TSO 101 either directly or via SCADA in order to ensure that the HPP 1 operates correctly and in compliance with operating requirements of the main grid 100.

The PPC 7 is connected to the HPP 1 at various points of measurement, at which various operating parameters such as power output, current and voltage may be measured for different portions of the HPP 1. For example, the PPC 7 is connected to WTG points of measurement 26 in the feeder lines 25 of each WTG 10, at which the PPC 7 is able to monitor the power output of each of the WTGs 10. The PPC 7 is also connected to PV points of measurement 56a, 56b in the feeder lines 55a, 55b of the PV modules, at which the PPC 7 is able to monitor the output of the PV modules (for example at the string level). The PPC 7 is also connected to a HPP point of measurement 8 at or close to the PoI bus 6, at which the PPC is able to monitor the power output of the HPP 1 as a whole. It will be appreciated that the above-mentioned connections may be physical wired connections or alternatively wireless connections between the PPC 7 and appropriately positioned sensors.

The PPC 7 is also connected to various light sensors 9a. 9b for sensing light conditions at various different locations around the HPP 1. For example, the PPC 7 is connected to at least one reference light sensor 9a for sensing light conditions at one or more reference locations outside the influence of WTG shadows, and a plurality of HPP light sensors 9b at various locations among the PV modules that are affected by WTG shadows.

The PPC 7 is also configured to measure, calculate, estimate or receive information related to other operating parameters for the WTGs 10 and the PV modules 50, including, for example: wind speed, direction and turbulence at one or more locations around the HPP 1; blade load at each of the WTGs; cable losses for each of the WTGs; operational status for each of the WTGs; noise constraints on WTG operation; sun position; time; date; current and voltage of the PV modules; cable losses for the PV modules; and the operational status of the PV modules. Cable losses may be measured directly, or alternatively calculated or estimated. The above-described operating parameters may be measured, calculated, estimated or received in any suitable manner, examples of which will be well known to the skilled person. The above-described operating parameters are all used in controlling operation of the HPP 1, as described in more detail below.

In accordance with one possible embodiment of the present invention, the PPC 7 is configured to operate a shadow tracking system 7c that is able to determine the blade shadows cast by the rotors 13 of the WTGs 10 on the PV modules 50 across the HPP 1 as a whole. The shadow tracking system 7c is configured to calculate the current positions of the blade shadows cast by the rotors 13 of the WTGs 10 using the power plant model (including the locations and dimensions of the WTGs 10 and the locations of the PV modules 50 relative to the WTGs 10) and in dependence on various operating parameters for the WTGs 10 and the PV modules 50 including: operational data for the WTGs (including the current nacelle yaw angle and blade pitch angle for each WTG); measured light conditions (as determined by the light sensors 9a, 9b); sun position; time; and date. The shadow tracking system 7c is an on-line system that is configured to determine blade shadows in dependence in real-time measurements of the light conditions within the HPP 1, although the shadow tracking system 7c may additionally be capable of determining blade shadows without access to light condition measurements based on the time, date and sun position data.

The PPC 7 is further configured to operate an optimisation program 7d that is able to calculate or predict WTG and PV power output for various different operating states of the HPP 1. The optimisation program 7d is configured to calculate or predict the WTG and PV power output in dependence on the output of the shadow tracking mechanism and further in dependence on various operating parameters for the WTGs 10 and the PV modules 50 including: wind speed, direction and turbulence within the HPP 1; power output for each of the WTGs; blade load at each of the WTGs; cable losses for each of the WTGs; operational status for each of the WTGs; noise constraints on WTG operation; sun position; time; date; power output of the PV modules; current and voltage of the PV modules; cable losses for the PV modules; and the operational status of the PV modules. The optimisation program is able to determine the expected WTG production loss and the expected PV production gain associated with a particular WTG control operation, and to determine an acceptable WTG production loss, for example based on the expected PV production gain.

During operation of the WGs 10, the WTG controllers 30 calculate nacelle yaw angle set points and blade pitch angle set points for their respective WTGs 10 in dependence on the measured wind conditions, measured blade loads and demand signals received from the PPC 7. In this way the WTG controllers 30 ensure that the WTGs 10 generate enough active and reactive power, and are not subjected to excessive loads. However, in accordance with the present invention, the HPP 1 is also configured to take account of the effect of blade shadows cast by the WTGs 10 on the PV modules 50 when controlling operation of the WGs 10, and to control operation of the WTGs 10 in order to control blade shadows cast by the WTGs 10 on the PV modules 50 and thereby optimise the power output of the PV modules 50.

In particular, the PPC 7 is able to determine whether or not performing a particular control operation, for example changing the nacelle yaw angle and/or the blade pitch angle for one or more of the WTGs 10 or stopping one or more of the WTGs 10, would result in an increase in the combined WTG and PV power output of the HPP 1 based on the outputs of the shadow tracking system 7c and the optimisation program 7d. The PPC 7 can then send instructions to one or more of the WTGs 10 to perform a specified control operation if it is determined that it is appropriate to do so and that doing so would increase the combined WTG and PV power output of the HPP 1. The WTG controllers of the respective WTGs 10 then control operation of the WTGs 10 in real time dependence on the instructions received from the PPC 7. In this way the WTGs 10 may be operated in such a way that the blade shadow area cast on the PV modules and the negative effects of shadow flicker are reduced, for example in cases where the loss in WTG power output associated with operating one or more WTGs 10 in a compromised mode of operation can be outweighed be an associated increase in PV power output.

The WTGs 10 may be controlled individually or in groups in order to take account of the different operating conditions such as wind strength and direction at different locations within the HPP 1, and the positions of nearby PV modules 50 relative to each WTG 10.

Where one or more of the WTGs 10 has been stopped, for example because the wind speed is below the cut-in speed or because it has been determined that the combined power output of the HPP 1 would be increased by stopping one or more of the WTGs 10, the inactive WTGs 10 may be moved into a minimum shadow configuration in which the nacelle is yawed and the blades are pitched into a configuration that results in the minimum possible blade shadow area being cast on nearby PV modules 50. However, inactive WTGs 10 may be set for cut-in if incoming wind is detected, for example by a LIDAR scanning system 9c.

The free converter capacity of idling or de-rated WTGs 10 can be used for providing reactive power. Meanwhile the reactive power contribution of the PV converters 52a, 52b or other WTG converters 22 can be reduced to optimise hardware utilisation and distribution losses within the HPP 1.

The above description relates to one possible embodiment of the present invention. However, it will be appreciated that many modifications and variations to the above-described example are possible within the scope of the appended claims. For example, in other embodiments different combinations of known, measured or calculated operating parameters for the WTGs and the PV modules may be used in determining the positions of the blade shadows cast by the rotors of the WTGs and/or in controlling operation of the WTGs in order to optimise the power output of the PV modules. In addition, in other embodiments the nacelle yaw angle set points and the blade pitch angle set points for the WTGs may be calculated by the PPC instead of the WTG controllers. In addition, in other embodiments it may be the WTG controllers instead of the PPC that are configured to determine when WTG control operations should be performed for optimising the power output of the PV modules.

In this case the WTG controllers may each be configured to determine the position of the blade shadow cast by the rotor of its respective WTG, and to determine whether or not performing a particular control operation for that WTG would result in an increase in the combined WTG and PV power output of the HPP. Other variations and modifications will also be apparent to those skilled in the art.

The invention claimed is:

1. A method of operating a hybrid power plant comprising at least one wind turbine generator (WTG) and at least one photovoltaic (PV) module, wherein at least one of the PV modules is at a location within the hybrid power plant that is affected by blade shadows, the method comprising:
   monitoring at least one operating parameter for one or more of the WTGs;
   monitoring at least one operating parameter for one or more of the PV modules; and
   controlling operation of the WTGs in dependence on the at least one operating parameter monitored for the WTGs and the at least one operating parameter monitored for the PV modules in order to control blade shadows cast by the WTGs on the PV modules and thereby optimise a power output of the PV modules.

2. The method of claim 1, wherein the monitored operating parameters for the WTGs include any one or more of: wind speed, direction and/or turbulence at one or more locations; the power output of one or more of the WTGs; blade load at one or more of the WTGs; cable losses for one or more of the WTGs; and an operational status of one or more of the WTGs.

3. The method of claim 1, wherein the monitored operating parameters for the PV modules include any one or more of: light conditions at one or more locations inside the hybrid power plant; light conditions at one or more reference locations outside an influence of WTG shadows; sun position; time; date; the power output of one or more of the PV modules; current or voltage of one or more of the PV modules; cable losses for one or more of the PV modules; and an operational status of one or more of the PV modules.

4. The method of claim 1, wherein the WTGs are controlled in dependence on an output of a shadow tracking system that is configured to determine the blade shadow cast by a rotor of one or more of the WTGs.

5. The method of claim 1, wherein the WTGs are controlled in dependence on a layout of the hybrid power plant.

6. The method of claim 1, wherein the WTGs are controlled individually and/or in groups in order to take account of different operating conditions at different WTGs and/or positions of nearby PV modules relative to each WTG.

7. The method of claim 1, wherein the step of controlling operation of the WTGs comprises determining whether or not performing a particular WTG control operation would increase or decrease a combined WTG and PV power output of the hybrid power plant, and performing the WTG control operation if it is determined that doing so would increase the combined WTG and PV power output of the hybrid power plant.

8. The method of claim 1, wherein the step of controlling operation of the WTGs comprises controlling a nacelle yaw angle of one or more of the WTGs in order to optimise the power output of the PV modules.

9. The method of claim 1, wherein the step of controlling operation of the WTGs comprises controlling a blade pitch angle of one or more of the WTGs in order to optimise the power output of the PV modules.

10. The method of claim 8, wherein a nacelle yaw angle set point(s) and/or a blade pitch angle set point(s) are calculated by a power plant controller.

11. The method of claim 8, wherein a nacelle yaw angle set point(s) and/or a blade pitch angle set point(s) are calculated by WTG controllers of the respective WTGs.

12. The method of claim 1, wherein the step of controlling operation of the WTGs comprises stopping one or more of the WTGs in order to optimise the power output of the PV modules.

13. The method of claim 1, wherein the step of controlling operation of the WTGs comprises moving one or more WTGs that have been stopped into a configuration in which a blade shadow cast by that WTG on nearby PV modules is reduced and/or minimised.

14. A controller configured to control operation of a hybrid power plant comprising at least one wind turbine generator (WTG) and at least one photovoltaic (PV) module, wherein at least one of the PV modules is at a location within the hybrid power plant that is affected by blade shadows; the controller, comprising:
a memory containing instructions; and
one or more processors which, when executing the instructions, are configured to:
monitor at least one operating parameter for one or more of the WTGs;
monitor at least one operating parameter for one or more of the PV modules; and
control operation of the WTGs in dependence on the at least one operating parameter monitored for the WTGs and the at least one operating parameter monitored for the PV modules in order to control blade shadows cast by the WTGs on the PV modules and thereby optimise a power output of the PV module.

15. The controller of claim 14, wherein the monitored operating parameters for the WTGs include any one or more of: wind speed, direction and/or turbulence at one or more locations; the power output of one or more of the WTGs; blade load at one or more of the WTGs; cable losses for one or more of the WTGs; and an operational status of one or more of the WTGs.

16. The controller of claim 14, wherein the monitored operating parameters for the PV modules include any one or more of: light conditions at one or more locations inside the hybrid power plant; light conditions at one or more reference locations outside an influence of WTG shadows; sun position; time; date; the power output of one or more of the PV modules; current or voltage of one or more of the PV modules; cable losses for one or more of the PV modules; and an operational status of one or more of the PV modules.

17. A machine readable storage medium comprising program code instructions which, when executed by one or more processor, configure the one or more processors to:
monitor at least one operating parameter for one or more wind turbine generators (WTGs);
monitor at least one operating parameter for one or more photovoltaic (PV) modules; and
control operation of the WTGs in dependence on the at least one operating parameter monitored for the WTGs and the at least one operating parameter monitored for the PV modules in order to control blade shadows cast by the WTGs on the PV modules and thereby optimise a power output of the PV module.

18. The machine readable storage medium of claim 17, wherein the monitored operating parameters for the WTGs include any one or more of: wind speed, direction and/or turbulence at one or more locations; the power output of one or more of the WTGs; blade load at one or more of the WTGs; cable losses for one or more of the WTGs; and an operational status of one or more of the WTGs.

19. The machine readable storage medium of claim 17, wherein the monitored operating parameters for the PV modules include any one or more of: light conditions at one or more locations inside a hybrid power plant that includes the one or more WTGs and the one or more PV modules; light conditions at one or more reference locations outside an influence of WTG shadows; sun position; time; date; the power output of one or more of the PV modules; current or voltage of one or more of the PV modules; cable losses for one or more of the PV modules; and an operational status of one or more of the PV modules.

* * * * *